(12) United States Patent
Sun et al.

(10) Patent No.: US 12,519,144 B2
(45) Date of Patent: Jan. 6, 2026

(54) BATTERY DEVICE AND BATTERY MANAGEMENT SYSTEM

(71) Applicant: INDUSTRIAL TECHNOLOGY RESEARCH INSTITUTE, Hsinchu (TW)

(72) Inventors: Chein-Chung Sun, Kaohsiung (TW); Chi-Hua Chen, Zhubei (TW); Chun-Hung Chou, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 527 days.

(21) Appl. No.: 18/072,578

(22) Filed: Nov. 30, 2022

(65) Prior Publication Data

US 2024/0178464 A1 May 30, 2024

(51) Int. Cl.
H01M 10/42 (2006.01)
H01M 10/48 (2006.01)
H01M 50/284 (2021.01)
H01M 50/296 (2021.01)
H02J 7/00 (2006.01)

(52) U.S. Cl.
CPC ......... *H01M 10/425* (2013.01); *H01M 10/48* (2013.01); *H01M 50/284* (2021.01); *H01M 50/296* (2021.01); *H02J 7/0047* (2013.01); *H01M 2010/4271* (2013.01); *H01M 2010/4278* (2013.01)

(58) Field of Classification Search
CPC .............. H01M 10/425; H01M 10/48; H01M 2010/4271; H01M 2010/4278; H01M 50/284; H01M 50/296; H02J 7/0047
See application file for complete search history.

(56) References Cited

U.S. PATENT DOCUMENTS

| 5,534,765 A | 7/1996 | Kreisinger et al. |
| 10,906,511 B2 | 2/2021 | Shih et al. |
| 2012/0166847 A1* | 6/2012 | Noda ................. H01M 10/482 713/323 |
| 2023/0360451 A1* | 11/2023 | Riley ................. H01M 10/482 |
| 2023/0411763 A1* | 12/2023 | Sheets, Jr. ............ F41G 11/003 |

FOREIGN PATENT DOCUMENTS

| CN | 215813234 U | 2/2022 |
| TW | I751396 B | 1/2022 |

* cited by examiner

*Primary Examiner* — Victoria H Lynch
(74) *Attorney, Agent, or Firm* — Maschoff Brennan

(57) ABSTRACT

A battery device comprises a case, a core pack, a signal unit and a non-volatile memory, wherein the core pack, the signal unit and the non-volatile memory are disposed in the case. The case has a first transmission terminal and a second transmission terminal. The signal unit is electrically connected to the core pack and the first transmission terminal, and is configured to output a voltage signal associated with the state of the core pack through the first transmission terminal. The non-volatile memory is electrically connected to the second transmission terminal, and is configured to receive and store information associate with the core pack through the second transmission terminal.

10 Claims, 5 Drawing Sheets

BATTERY DEVICE AND BATTERY MANAGEMENT SYSTEM

BACKGROUND

1. Technical Field

This disclosure relates to a battery device and battery management system.

2. Related Art

In general, a rechargeable battery device can be divided into two parts: a core pack and a battery management unit (BMU). For the rechargeable battery device with the two parts integrated configuration, once an abnormal condition occurs and the battery device needs to be repaired, although the battery management unit can provide battery information to assist in troubleshooting, it will require disassembly of the entire device; for the rechargeable battery device with the two parts separated configuration, once the original battery management unit cooperated with the core pack is replaced such that the core pack needs to cooperate with another battery management unit, the battery information must be lost and the detection and measurement for the core pack should be redone, which causes a certain level of inconvenience.

SUMMARY

According to one or more embodiment of this disclosure, a battery device comprises a case, a core pack, a signal unit and a non-volatile memory, wherein the core pack, the signal unit and the non-volatile memory are disposed in the case. The case has a first transmission terminal and a second transmission terminal. The signal unit is electrically connected to the core pack and the first transmission terminal, and configured to output a voltage signal associated with the state of the core pack through the first transmission terminal. The non-volatile memory is electrically connected to the second transmission terminal, and configured to receive and store information associated with the core pack through the second transmission terminal.

According to one or more embodiment of this disclosure, a battery management system comprises a battery device, measuring wire bunch, communication wire bunch and data processing device. The battery device comprises a case, a core pack, a signal unit and a non-volatile memory, wherein the core pack, the signal unit and the non-volatile memory are disposed in the case. The signal unit is electrically connected to the core pack, and configured to output a voltage signal associated with the state of the core pack. The measuring wire bunch is electrically connected to the signal unit and the communication wire bunch is electrically connected to the non-volatile memory. The data processing device is disposed outside the case, connected to the signal unit through the measuring wire bunch, and connected to the non-volatile memory through the communication wire bunch. The data processing device is configured to obtain the voltage signal from the signal unit, generate current battery information according to the voltage signal, and write the current battery information into the non-volatile memory through the communication wire bunch.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
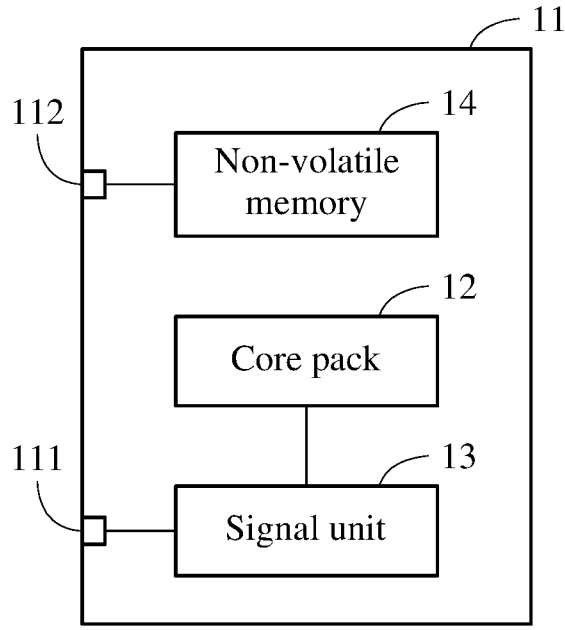
FIG. 1 is a functional block diagram of a battery device according to one embodiment of the present disclosure.

Please refer to FIG. 1 which is a functional block diagram of a battery device according to one embodiment of the present disclosure. As illustrated in FIG. 1, a battery device 10 comprises a case 11, a core pack 12, a signal unit 13 and a non-volatile memory 14, wherein the core pack 12, the signal unit 13 and the non-volatile memory 14 are disposed in the case 11. The case 11 has a first transmission terminal 111 and a second transmission terminal 112. The signal unit 13 is electrically connected to the core pack 12 and the first transmission terminal 111, and configured to output a voltage signal associated with the state of the core pack 12 through the first transmission terminal 111. The non-volatile memory 14 is electrically connected to the second transmission terminal 112, and configured to receive and store information associated with the core pack 12 through the second transmission terminal 112.

In the present embodiment, the core pack 12 may include a plurality of rechargeable batteries connected in series and/or in parallel to achieve specific application requirements. In one implementation, the core pack 12 may include a plurality of lithium batteries connected in series to achieve a specific working voltage, or connected in parallel to expand the overall electrical capacity of the core pack 12 or to achieve specific working currents for the requirement. The core pack 12 may be installed in a specific case 11 in the form of a module, and the case 11 may be made of, for example, aluminum alloy material, carbon fiber material, or the like, which is not limited in the present disclosure. The first transmission terminal 111 and the second transmission terminal 112 of the case 11 are connected to the signal unit 13 and the non-volatile memory 14, respectively. In one implementation, the first transmission terminal 111 and the second transmission terminal 112 may be implemented as different connectors. The first transmission terminal 111 may be implemented as a pin header connector or a multi-core wire connector, and the second transmission terminal 112 may be implemented as one or two connectors. Specifically, the second transmission terminal 112 may include a connector configured to connect the power line and a connector configured to connect the data transmission line, and the two connectors may be integrated as one connector or be two connectors separately. The power line may provide a working voltage (e.g., 3.3V or 5V), and the data transmission line may be a data transmission line using a common communication standard such as I2C, RS-232, Serial Peripheral Interface (SPI), etc. In another implementation, the first transmission terminal 111 and the second transmission terminal 112 may be integrated as one connector.

The signal unit 13 may output a voltage signal associated with battery-related information such as voltage, temperature, current, etc., of the core pack 12. In one implementation, the signal unit 13 is a voltage output element electrically connected to the core pack 12, so as to directly output the voltage signal of the core pack 12. In another implementation, the signal unit 13 includes a resistor with a fixed resistance and a voltage output element across the constant-value resistor, electrically connected to the core pack 12 through the voltage output element, and outputs a voltage signal for an external data processing device to read and convert it into the current of the core pack 12. In still another implementation, the signal unit 13 includes a thermistor and a voltage output element across the thermistor, wherein the thermistor is disposed at the core pack 12, electrically connected to the core pack 12 through the voltage output element, and outputs a voltage signal for an external data processing device to read and convert it into the temperature of the core pack 12. In yet another implementation, the signal unit 13 includes two or three among the voltage output element electrically connected to the core pack 12, the assembly of the resistor with the fixed resistance and the voltage output element, and the assembly of the thermistor and the voltage output element. The above-mentioned voltage output elements are, for example, conductive contacts, circuits or wires.

The non-volatile memory 14 may be flash memory, non-volatile random access memory, or the like. When the non-volatile memory 14 is driven by electricity (for example, powered by the aforementioned power line), the non-volatile memory 14 may perform data reading or/and writing operations with an external device through the second transmission terminal 112. In detail, the non-volatile memory 14 may store various information associated with the core pack 12, such as the version, model, historical record of the power or/and temperature state of the core pack 12, etc., and may still retain the above information after the power supply is removed. In addition, in this embodiment, there is no limitation on the configuration of the core pack 12, the signal unit 13 and the non-volatile memory 14 in the case 11. However, in one implementation, the battery device 1 further includes a circuit board, the circuit board is disposed in the case 11 with the signal unit 13 and the non-volatile memory 14 integrated on the circuit board, and the signal unit 13 may be electrically connected to the core pack 12 through the circuit board. With the arrangement of the circuit board, the wiring inside the battery device 1 may be simplified, improving the convenience of assembly.

Figure 2:
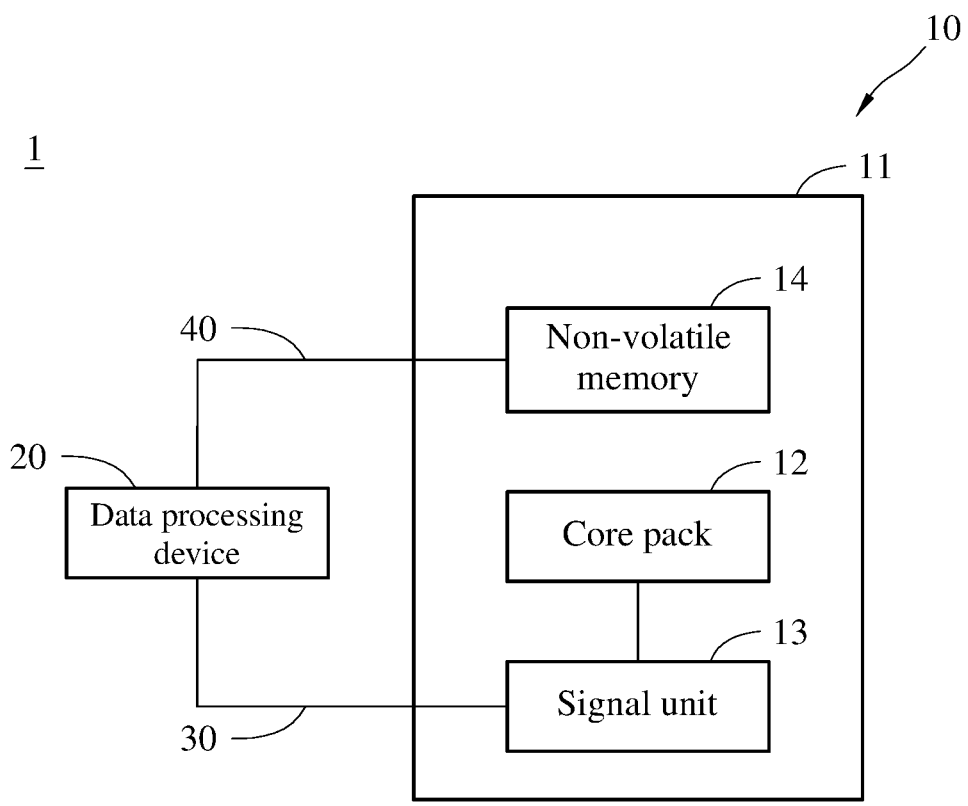
FIG. 2 is a functional block diagram of a battery management system according to one embodiment of the present disclosure.

Please refer to FIG. 2 which is a functional block diagram of a battery management system according to one embodiment of the present disclosure. As illustrated in FIG. 2, a battery management system 1 comprises a battery device 10, a data processing device 20, a measuring wire bunch 30 and a communication wire bunch 40. The battery device 10 comprises a case 11, a core pack 12, a signal unit 13 and a non-volatile memory 14, wherein the core pack 12, the signal unit 13 and the non-volatile memory 14 are disposed in the case 11. The signal unit 13 is electrically connected to the core pack 12, and configured to output a voltage signal associated with the state of the core pack 12. The measuring wire bunch 30 is electrically connected to the signal unit 13, and the communication wire bunch 40 is electrically connected to the non-volatile memory 14. The measuring wire bunch 30 and the communication wire bunch 40 may be electrically connected to the signal unit 13 and the non-volatile memory 14 through the first transmission terminal 111 (corresponding to FIG. 1) and the second transmission terminal 112 (corresponding to FIG. 1) of the case 11, respectively. As mentioned above, the first transmission terminal 111 and the second transmission terminal 112 may be implemented as one or more connectors, and the descriptions are not repeated herein. The data processing device 20 is disposed outside the case 11 and connected to the battery device 10. In detail, the data processing device 20 is connected to the signal unit 13 through the measuring wire bunch 30 and connected to the non-volatile memory 14 through the communication wire bunch 40. The data processing device 20 is configured to obtain the above-mentioned voltage signal from the signal unit 13, generate current battery information according to the voltage signal, and write the current battery information into the non-volatile memory 14 through the communication wire bunch 40.

In the present embodiment, the descriptions about the battery device 10 may be the same as that of the battery device 10 shown in FIG. 1, and are not repeated herein. The data processing device 20 may be a monitoring circuit board provided with a microcontroller, such as a battery management unit (BMU) circuit board. Specifically, the data processing device 20 may receive, through the measuring wire bunch 30, the voltage signal (such as a voltage signal associated with the output voltage, current or/and temperature of the battery) output from the core pack 12 through the signal unit 13, and perform related calculations to obtain the current battery information of the core pack 12, such as voltage, current, temperature, state of charge (SoC), depth of discharge (DoD), state of health (SoH), state of power (SoP), state of safety (SoS), charge current limit (CCL), discharge current limit (DCL), remaining power (ampere-hours), remaining energy (kWh), degraded capacity, abnormal information, etc. In one embodiment, for the above-mentioned current, the data processing device 20 may pre-store the resistance value of the resistor with the fixed resistance included in the signal unit 13, so as to convert the voltage signal output by the signal unit 13 into a current. For the above-mentioned temperature, the data processing device 20 may pre-store the resistance value of the thermistor included in the signal unit 13 corresponding to a base temperature, so as to convert the voltage signal output by the signal unit 13 into a temperature. The rest of the above-mentioned parameters may be calculated by the known programs running on the BMU, and the calculation process of the above parameters are not described in detail herein.

Moreover, the data processing device 20 may actuate the non-volatile memory 14 through the communication wires 40 and transmit the above-mentioned data after calculation to the non-volatile memory 14 for storage. The information from the calculation of the data processing device 20 is stored by the non-volatile memory 14. When the data processing device 20 is disconnected from the battery device 10 or the battery device 10 is connected to another data processing device, the battery device 10 may retain the information calculated by the data processing device 20, so that the battery state of the battery device 10 may be tracked.

In another embodiment, the data processing device 20 may be a device for maintenance after the battery device 10 and the original battery management unit are disassembled, such as computers, computing machines, etc. Specifically, the data processing device 20 may obtain the information of the core pack 12 at that time through the measuring wire bunch 30 and the signal unit 13, and may also access the relevant information of the core pack 12 in the non-volatile memory 14 through the communication wire bunch 40. In addition, in one embodiment, the data processing device 20 may also be equipped with a network connection function, and upload the above-mentioned information to the cloud database for the purpose of life cycle maintenance, various data analysis, etc., of the core pack 12. Also, the data processing device 20 may include a display that may display the relevant information of the core pack 12.

Figure 3:
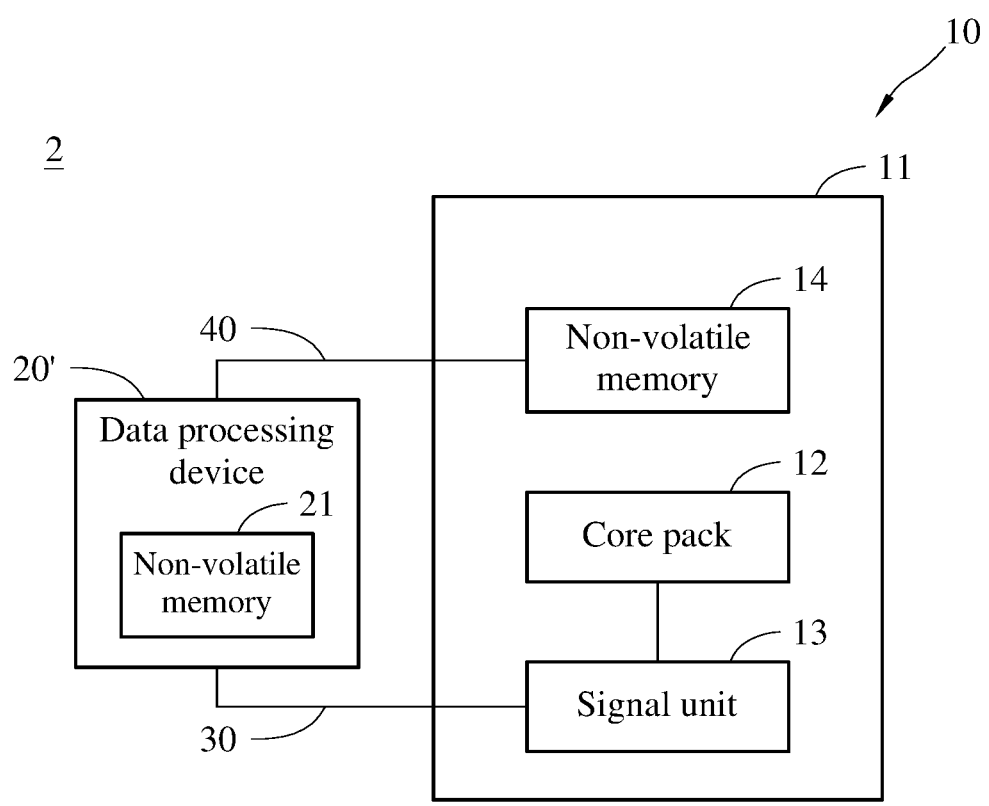
FIG. 3 is a functional block diagram of a battery management system according to another embodiment of the present disclosure.

Please refer to FIG. 3 which is a functional block diagram of a battery management system according to another embodiment of the present disclosure. In the present embodiment, a battery management system 2 includes a battery device 10, a case 11, a core pack 12, a signal unit 13, a non-volatile memory 14, a data processing device 20', a measuring wire bunch 30 and a communication wire bunch 40 which are substantially the same as those in the foregoing embodiments, and the battery device 10 is also connected to the data processing device 20' through the measuring wire bunch 30 and the communication wire bunch 40. The same operations as those in the aforementioned embodiment are not repeated herein. As illustrated in FIG. 3, the data processing device 20' further includes a non-volatile memory 21. When the data processing device 20' perform calculation on the voltage signal from the signal unit 13 and transmits the battery information to the non-volatile memory 14 of the battery device 10, the battery information may be synchronously stored in the non-volatile memory 21 inside the data processing device 20' as a backup, so that when one of the non-volatile memory 14 or 21 is damaged, the battery information may still be retained.

Figure 4:
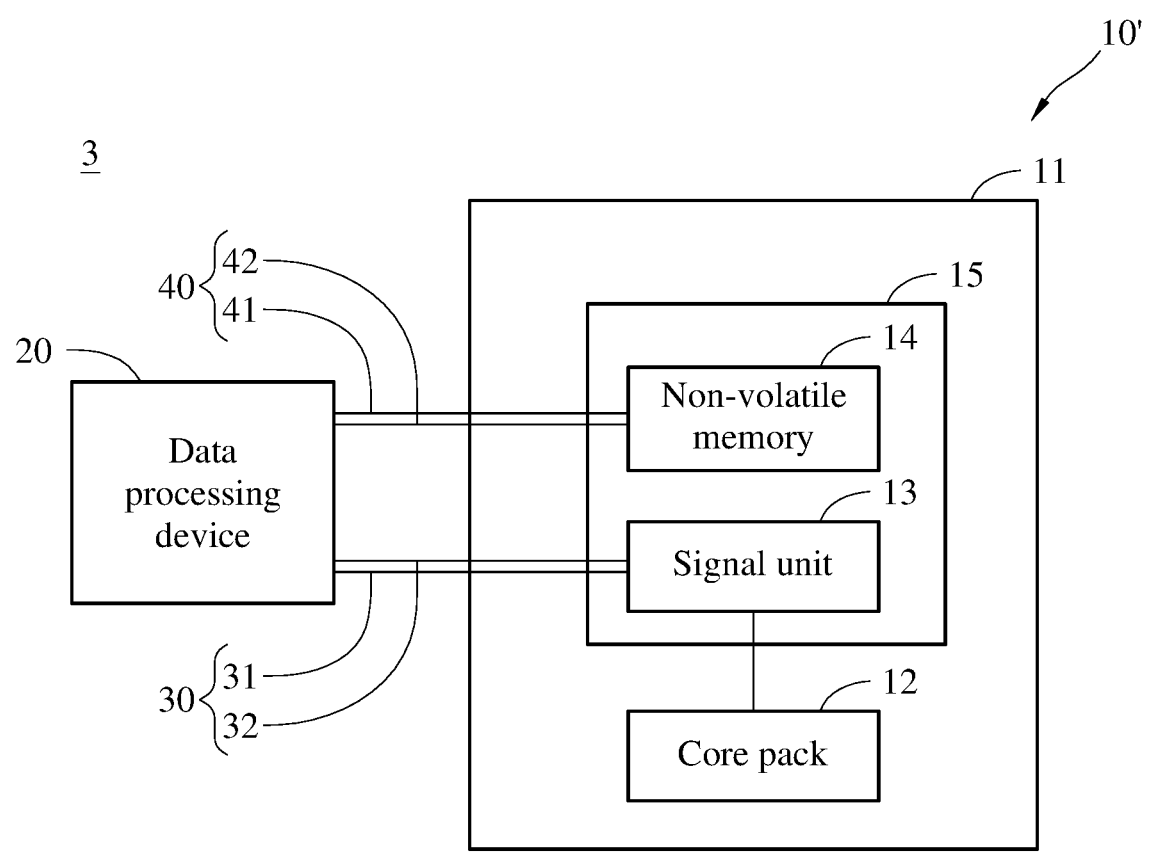
FIG. 4 is a functional block diagram of a battery management system according to still another embodiment of the present disclosure.

Please refer to FIG. 4 which is a functional block diagram of a battery management system according to still another embodiment of the present disclosure. In the present embodiment, a battery management system 3 includes a battery device 10', a measuring wire bunch 30, a communication wire bunch 40, and a data processing device 20, wherein the measuring wire bunch 30 includes a voltage/current signal line 31 and a temperature signal line 32. The voltage/current signal line 31 is configured to output a voltage signal associated with the output voltage/current state of the core pack 12, and the temperature signal line 32 is configured to output a voltage signal associated with the temperature state of the core pack 12. The communication wire bunch 40 includes a power supply line 41 and a data transmission line 42. When supplying power to the non-volatile memory 14 through the power supply line 41, the data processing device 20 is configured to obtain the voltage of the core pack 12 according to the voltage signal output by the voltage/current signal line 31 or convert the voltage signal into the current of the core pack 12, and convert the voltage signal output by the temperature signal line 32 into the temperature of the core pack 12. The data processing device 20 uses the obtained information as the current battery information or performs other calculations on the obtained information to generate the current battery information, and writes the current battery information into the non-volatile memory 14 through the data transmission line 42. In addition to the case 11, the core pack 12, the signal unit 13 and the non-volatile memory 14 that are the same as those of the aforementioned embodiments, the battery device 10' further includes a circuit board 15 disposed in the case 11, wherein the signal unit 13 and the non-volatile memory 14 are integrally disposed on the circuit board 15, and the signal unit 13 is electrically connected to the core pack 12 through the circuit board 15.

In the present embodiment, the connection between the core pack 12 and the signal unit 13 may be implemented through the wiring of the circuit board 15, so the connection between the core pack 12 and the signal unit 13 in the present embodiment is different from that of which illustrated in FIG. 1 and FIG. 2. It should be noted that although the signal unit 13 and the non-volatile memory 14 of this embodiment are disposed on the same circuit board 15, it does not mean that there must be a signal connection between the two. In other words, the signal unit 13 and the non-volatile memory 14 may or may not have a direct signal connection with each other. In addition, the voltage/current signal line 31 of this embodiment may include a voltage signal line and a current signal line to output voltage signals associated with voltage and current respectively, and the communication wire bunch 40 may include but not limited to a power supply line 41 and a data transmission line 42. For example, the communication wire bunch 40 may further include a clock signal line to record the time information of reading or writing the non-volatile memory 14.

In the present embodiment, the non-volatile memory 14 may store historical battery information, and the data processing device 20 is further configured to read the historical battery information through the data transmission line 42 when supplying power through the power supply line 41, so that when the battery device 2 is reconnected after being disconnected from the data processing device 20, regardless of whether the data processing device 20 previously connected to the battery device 10' is the same as the data processing device 20 reconnected to the battery device 10', the reconnected data processing device 20 may then receive the historical battery information previously calculated by the previously connected data processing device 20 and stored in the non-volatile memory 14. Moreover, the data processing device 20 may be configured to read the above-mentioned historical battery information through the communication wires 40 and generate the current battery information according to the historical battery information. For example, the current battery information may include a comparison result. The data processing device 20 may calculate a current capacity of the core pack 12 through the data of the signal unit 13 and obtain a historical capacity of the battery pack 12 from the non-volatile memory 14 through the communication wire bunch 40. When the data processing device 20 compares the two (the current capacity and the historical capacity) and determines that the current capacity is lower than the historical capacity to a certain extent (such as the rate of difference is greater than 1%), the data processing device 20 generates a capacitor degradation information, and stores the capacitor degradation information together with a time stamp in the non-volatile memory 14. In this way, when the battery device 10' is maintained, the relevant historical abnormal information may be read from the non-volatile memory 14 to optimize the maintenance operation.

In addition, when determining that the voltage, current or temperature corresponding to the voltage signal output by the signal unit 13 exceeds a preset measurement value, the data processing device 20 of the present embodiment is also configured to write the determined event content and time point of the determining into the non-volatile memory 14 through the communication harness 40. For example, the core pack 12 may encounter an over-discharge problem with low voltage when it is discharged, an over-charge problem with high voltage when it is charged, or an over-temperature problem that may occur at any time. In this situation, the data processing device 20 may not only send a message to control the relevant protection mechanism, but also record the time point of the specific state of the core pack 12 in the non-volatile memory 14 through the communication wire bunch 40.

Figure 5:
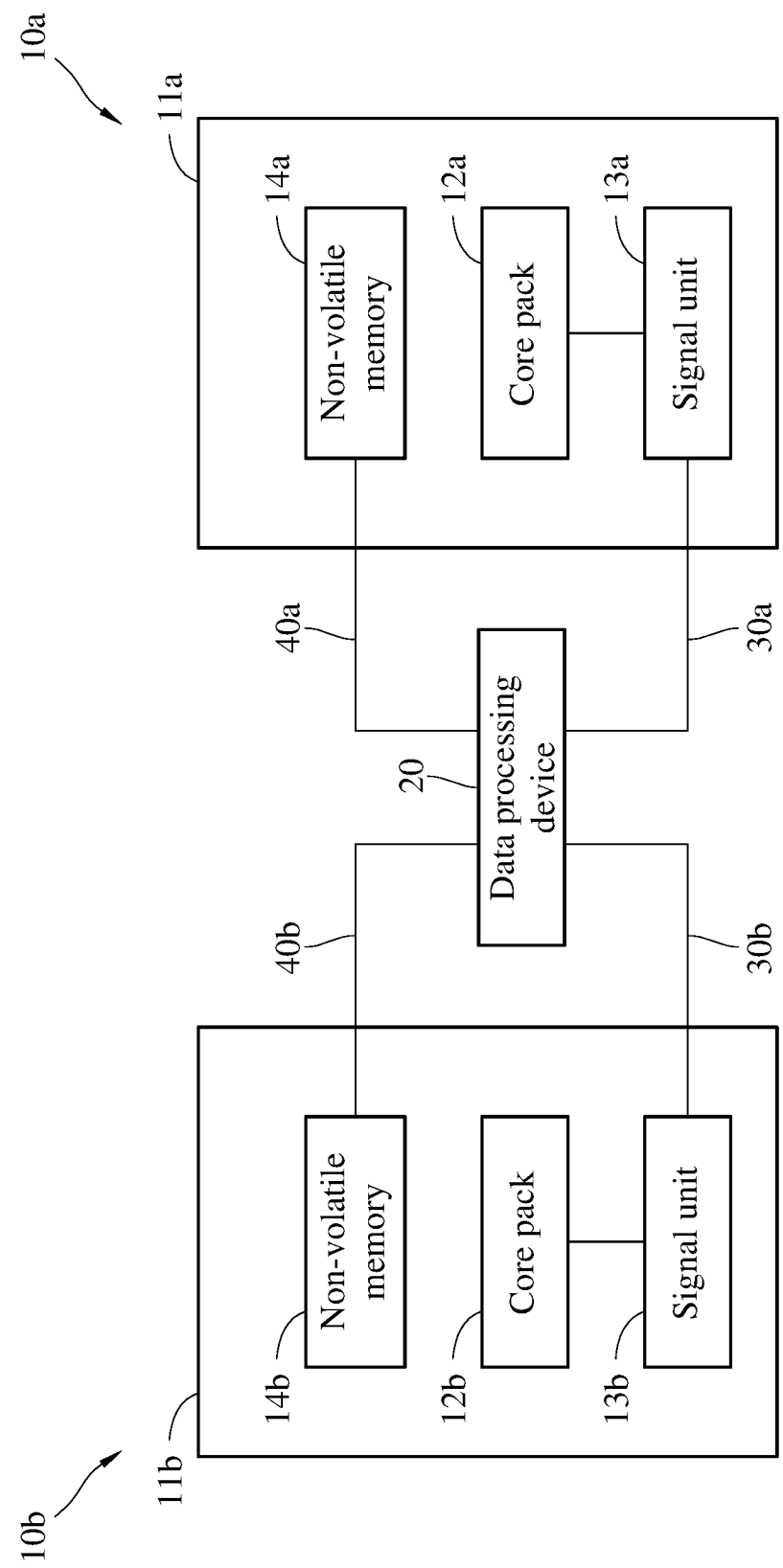
FIG. 5 is a functional block diagram of a battery management system according to yet another embodiment of the present disclosure.

Please refer to FIG. 5 which is a functional block diagram of a battery management system according to yet another embodiment of the present disclosure. As illustrated in FIG. 5, a battery management system 4 includes a plurality of battery devices 10a and 10b, a data processing device 20, a plurality of measuring wire bunches 30a and 30b, and a plurality of communication wire bunches 40a and 40b. In detail, FIG. 5 exemplarily shows that the number of the battery devices 10a and 10b, the number of the measuring wire bunches 30a and 30b, and the number of the communication wire bunches 40a and 40b are each two, but not limited to this.

Each battery device 10a/10b includes a case 11a/11b, a core pack 12a/12b, a signal unit 13a/13b and a non-volatile memory 14a/14b, wherein the core pack 12a/12b, the signal unit 13a/13b and the non-volatile memory 14a/14b are disposed in the corresponding case 11a/11b. The signal unit 13a/13b is electrically connected to the corresponding core pack 12a/12b and is configured to output a voltage signal associated with the state of the core pack 12a/12b. The measuring wire bunch 30a/30b is electrically connected to the corresponding signal unit 13a/13b, and the communication wire bunch 40a/40b is electrically connected to the corresponding non-volatile memory 14a/14b. The data processing device 20 is disposed outside the cases 10a and 10b, connected to the signal unit 13a/13b through the measuring wire bunch 30a/30b, and connected to the non-volatile memory 14a/14b through the communication wire bunch 40a/40b. The data processing device 20 is configured to obtain a voltage signal from the signal unit 13a, generate corresponding current battery information according to the voltage signal, and write the current battery information into the corresponding non-volatile memory 14a, and configured to obtain the voltage signal from the signal unit 13b, generate corresponding current battery information according to the voltage signal, and write the current battery information into the corresponding non-volatile memory 14b. That is, the battery devices 10a and 10b may be electrically connected to a single data processing device 20 in a many-to-one manner through the corresponding measuring wire bunch 30a/30b and the communication wire bunch 40a/40b. In addition, the battery devices 10a and 10b may each be implemented as the battery device 10 or 10' described in the foregoing embodiments.

In the embodiment illustrated in FIG. 5, the battery devices 10a and 10b may be commonly connected to one data processing device 20; that is, the data processing device 20 may simultaneously read data from the signal units 13a and 13b of the multiple battery devices 10a and 10b, and write the battery information into the non-volatile memories 14a and 14b corresponding to the battery devices 10a and 10b after calculation.

Figure 6:
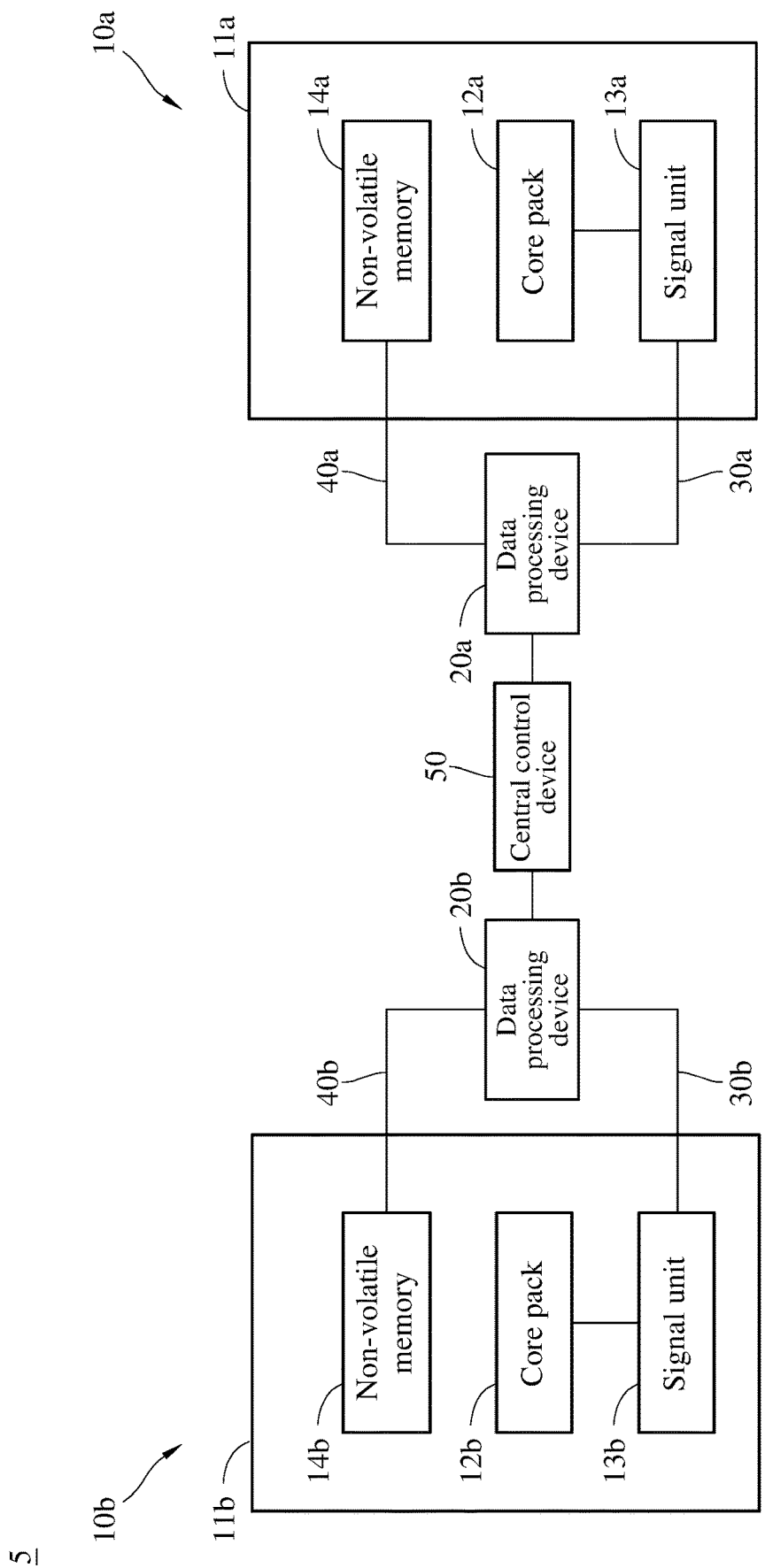
FIG. 6 is a functional block diagram of a battery management system according to further another embodiment of the present disclosure.

Please refer to FIG. 6 which is a functional block diagram of a battery management system according to further another embodiment of the present disclosure. In the present embodiment, a battery management system 5 includes battery devices as shown in the embodiment of FIG. 5, and the description of the elements with the same reference numbers mentioned before is omitted here. As illustrated in FIG. 6, the battery management system 4 in this embodiment includes a plurality of data processing devices 20a/20b respectively corresponding to the battery devices 10a/10b, and further includes a central control device 50 connected to the data processing device 20a and the data processing device 20b and configured to obtain the information of the battery device 10a and the battery device 10b through the data processing device 20a and the data processing device 20b via communication (such as Communication port, COM, CAN BUS, etc.). That is, the data processing devices 20a/20b may be connected to a single central control device 50 in a many-to-one manner. In detail, the central control device 50 may be regarded as the core control device of the battery management system 5, and may upload the calculated data to the cloud database or send it back to a specific server. The battery management system 5 illustrated in FIG. 6 may be applied to a large-scale power supply system, such as the power supply system of an electric vehicle, so as to achieve a decentralized battery management configuration. It should be noted that the number of data processing devices connected to the central control device and the number of battery devices connected to each data processing device shown in FIG. 6 are merely illustrative, and said number is not limited to the present disclosure.

The battery management system of the present disclosure may include other control methods in addition to the implementations in the above-mentioned embodiments. For example, the data processing device may periodically write the current battery information into the non-volatile memory, or may temporarily store the first current battery information in the temporary memory of the data processing device itself, and after comparing the second current battery information generated at the next time point with the first current battery information, determine whether to write the second current battery information into the non-volatile memory according to the comparison result. In another implementation, the data processing device may read the historical battery information in the non-volatile memory firstly according to the time point when the non-volatile memory is connected, and write the current battery information into the non-volatile memory before disconnecting from the non-volatile memory.

In view of the above description, the battery device of the present disclosure receives and stores the information of the core pack through the information transmission terminal (i.e. the first transmission terminal and the second transmission terminal) and the internal non-volatile memory. The battery management system of the present disclosure may obtain the information of the core pack inside the battery device through the data processing device outside the battery device, and write the relevant data generated by processing the information into the non-volatile memory inside the battery device. In this way, when the data processing device is replaced with another data processing device, it is not necessary to re-measure the core pack, and the faults of the data processing device or the core pack may be independently repaired to achieve simplification in design and use. In addition, the battery devices and the data processing device may be integrated in a system, and the overall control and data management of a large-scale power supply system may be performed through the central control device.

What is claimed is:

1. A battery device, comprising:
   a case having a first transmission terminal and a second transmission terminal;
   a core pack disposed in the case;
   a signal unit disposed in the case, electrically connected to the core pack and the first transmission terminal, and configured to output a voltage signal associated with a state of the core pack through the first transmission terminal; and
   a non-volatile memory disposed in the case, electrically connected to the second transmission terminal, and configured to receive and store information associate with the core pack through the second transmission terminal.

2. The battery device of claim 1, further comprising a circuit board disposed in the case, wherein the signal unit and the non-volatile memory are disposed on the circuit board, and the signal unit is electrically connected to the core pack through the circuit board.

3. A battery management system, comprising:
   at least one battery device comprising:
      a case;
      a core pack disposed in the case;
      a signal unit disposed in the case, electrically connected to the core pack, and configured to output a voltage signal associated with a state of the core pack; and
      a non-volatile memory disposed in the case;
   a measuring wire bunch electrically connected to the signal unit;
   a communication wire bunch electrically connected to the non-volatile memory; and
   at least one data processing device disposed outside the case, connected to the signal unit through the measuring wire bunch, and connected to the non-volatile memory through the communication wire bunch, wherein the at least one data processing device is configured to obtain the voltage signal from the signal unit, generate current battery information according to the voltage signal, and write the current battery information into the non-volatile memory through the communication wire bunch.

4. The battery management system of claim 3, wherein the communication wire bunch comprises a power supply line and a data transmission line, and the at least one data processing device is configured to write the current battery information into the non-volatile memory through the data transmission line when supplying power to the non-volatile memory through the power supply line.

5. The battery management system of claim 4, wherein the non-volatile memory stores historical battery information, and the at least one data processing device is configured to read the historical battery information through the data transmission line when supplying the power through the power supply line.

6. The battery management system of claim 3, wherein the non-volatile memory stores historical battery information, and the at least one data processing device is configured to read the historical battery information through the communication wire bunch and generate the current battery information according to the historical battery information.

7. The battery management system of claim 3, wherein the at least one data processing device is further configured to write determined event content and a determined time point into the non-volatile memory when determining that a value associated with the state of the core pack corresponding to the voltage signal exceeds a preset measurement value.

8. The battery management system of claim 3, wherein the at least one battery device further comprises a circuit board, the circuit board is disposed in the case, the signal unit and the non-volatile memory are disposed on the circuit board, and the signal unit is electrically connected to the core pack through the circuit board.

9. The battery management system of claim 3, wherein the at least one battery device comprises battery devices, and the battery devices are electrically connected to the at least one data processing device in a many-to-one manner.

10. The battery management system of claim 3, wherein the at least one battery device comprises battery devices and the at least one data processing device comprises data processing devices, and the battery management system further comprises a central control device, the battery devices are electrically connected to the data processing devices corresponding to the battery devices, the data processing devices are connected to the central control device in a many-to-one manner, and the central control device is configured to obtain information of the battery devices through the data processing devices.

* * * * *